United States Patent [19]

Cabet et al.

[11] 4,009,350

[45] Feb. 22, 1977

[54] LEVEL REGULATOR OF THE DIGITAL TYPE

[75] Inventors: Alain Cabet, Paris; Gaston Pinier, Longjumeau; Pierre Semur, Garches; Marie-Annick Roy, Antony, all of France

[73] Assignee: Compagnie Industrielle des Telecommunications Cit-Alcatel, Paris, France

[22] Filed: Oct. 6, 1975

[21] Appl. No.: 620,134

[30] Foreign Application Priority Data

Oct. 8, 1974  France .......................... 74.33786

[52] U.S. Cl. .................. 179/15 BP; 179/15 FD; 325/405
[51] Int. Cl.² ........................................ H04J 1/16
[58] Field of Search ....... 179/15 BP, 15 BF, 84 VF, 179/175.2 R, 175.2 C, 15 FD; 325/2, 347, 400, 405

[56] References Cited

UNITED STATES PATENTS

| 3,223,783 | 12/1965 | Yamrmoto | 179/84 VF |
| 3,449,525 | 6/1969 | Berry | 179/15 BP |
| 3,470,480 | 9/1969 | Smart | 325/400 |
| 3,863,030 | 1/1975 | Mills | 179/84 VF |
| 3,882,283 | 5/1975 | Provofoot | 179/84 VF |
| 3,937,899 | 2/1976 | Denenberg | 179/84 VF |

Primary Examiner—David L. Stewart

[57] ABSTRACT

The invention concerns a level regulator for a frequency division multiplex group, having a variable gain network controlled basically by the observing of the amplitude of a pilot wave contained in the multiplex group, comprising a digital filter preceded by a sampling device and an analog-digital converter for extracting the pilot wave from the multiplex group downstream from the variable gain network, a calculation circuit connected to the digital filter for determining a number which is a function of the level, over a predetermined interval of time, of the pilot wave at the output of the filter, and a digital comparison element which compares that number with a reference value with a view to generating a control signal for the said network. In a particular embodiment of the invention, the multiplex group is transposed towards the low frequencies before being digitally processed.

5 Claims, 2 Drawing Figures

LEVEL REGULATOR OF THE DIGITAL TYPE

The invention comes within the branch of devices for the transmission of signals by means of frequency division multiplex groups. It concerns a transmission level regulator for a multiplex group, in which the regulating for a group is controlled basically by the observting of the amplitude of a pilot wave transmitted with that group. It applies more particularly, in telephonic transmissions by frequency division multiplex groups, for regulating at the receiving end the level of the primary groups (formed by twelve telephonic channels).

It is a known practice, for automatically adjusting the transmission level of a frequency division multiplex group from a pilot wave contained in that group to use a regulator in which the pilot wave is extracted from the multiplex group at the output of the regulator by means of an analog filter, the level of that wave being subsequently detected in a level detector with a view to being compared with a reference level. The result of the comparison is applied for controlling a variable gain network which adjusts the transmission level of the multiplex group to the required value. The extraction of the pilot wave requiring in general a very narrow band-pass filter, the cost of such a regulator is high.

It is a known practice, for reducting that cost, in the case where a great number of multiplex groups are to be regulated, to use a regulator of the preceding type in which the filter, the level detector and the comparison element are common to the various multiplex systems to be processed. The variable gain networks enabling respectively the adjusting of the level of each of the multiplex groups are, in that case, connected in a cyclic manner to the filter and the controlling of each network is effected during the cycle time imparted to the multiplex group associated with that network which a switch makes it possible, for that purpose, to connect to the output of the comparison element.

Such a regulator having a cyclic operation nevertheless has the disadvantage of too long a cycle. The duration of the cycle is indeed imposed mainly by the response time of the filter, that response time being all the longer as the filter has a narrow band. Thus, in the case of an application to the regulating of primary groups of telephonic channels, that response time is generally in the order of 200 ms for each group: if it is required to precess, for example, 50 groups, each group will be taken in charge only every 10 seconds. Such a long cycle time does not make it possible to detect the transitory phenomena which can occur. Moreover, when the regulating is effected by steps on connections comprising several regulation stages in series, this being preferable for avoiding greater overshoots, the response of such a regulator to a large jump in level requires several cycles and can last a few minutes.

According to the invention, these disadvantages are overcome by using a digital filtering enabling the processing on a time-sharing basis of several frequency division multiplex groups.

The present invention has as its object a level regulator for a frequency division multiplex transmission system, having a variable gain network for adjusting the transmission level of a multiplex group based on the amplitude of a pilot wave contained in that group comprising a sampling device connected to the variable gain network and rhythmed by a clock, an analog-digital convertor for sending out digital values of the samples coming from the sampling device, a digital filtering means having a narrow band sending out successively, in response to the digital values of the samples, digital values $y$ representing the pilot wave extracted from the multiplex system downstream from the variable gain network, a calculation circuit forming, from the succive values of $y$, a new value $z$ which is a function of the level of the pilot wave downstream from the variable gain network over a time interval of several sampling periods, and a comparison element for comparing the said value $z$ with a reference value, the variable gain network being controlled from result of that comparison.

In a first embodiment of the invention, the sampling device receives directly the multiplex system coming from the variable gain network.

In a second embodiment of the invention, the multiplex system coming from the variable gain network is frequency-transposed before being sampled, so that the pilot wave be brought to a low frequency.

Other characteristics and advantages of the invention will become apparent from the description herebelow which will be given with reference to the accompanying drawing in which.

The regulators illustrated ensure, on a time sharing basis, the regulating of the level of $n$ frequency division multiplex groups; by way of an example, primary groups of telephonic channels have been taken into consideration.

Figure 1:
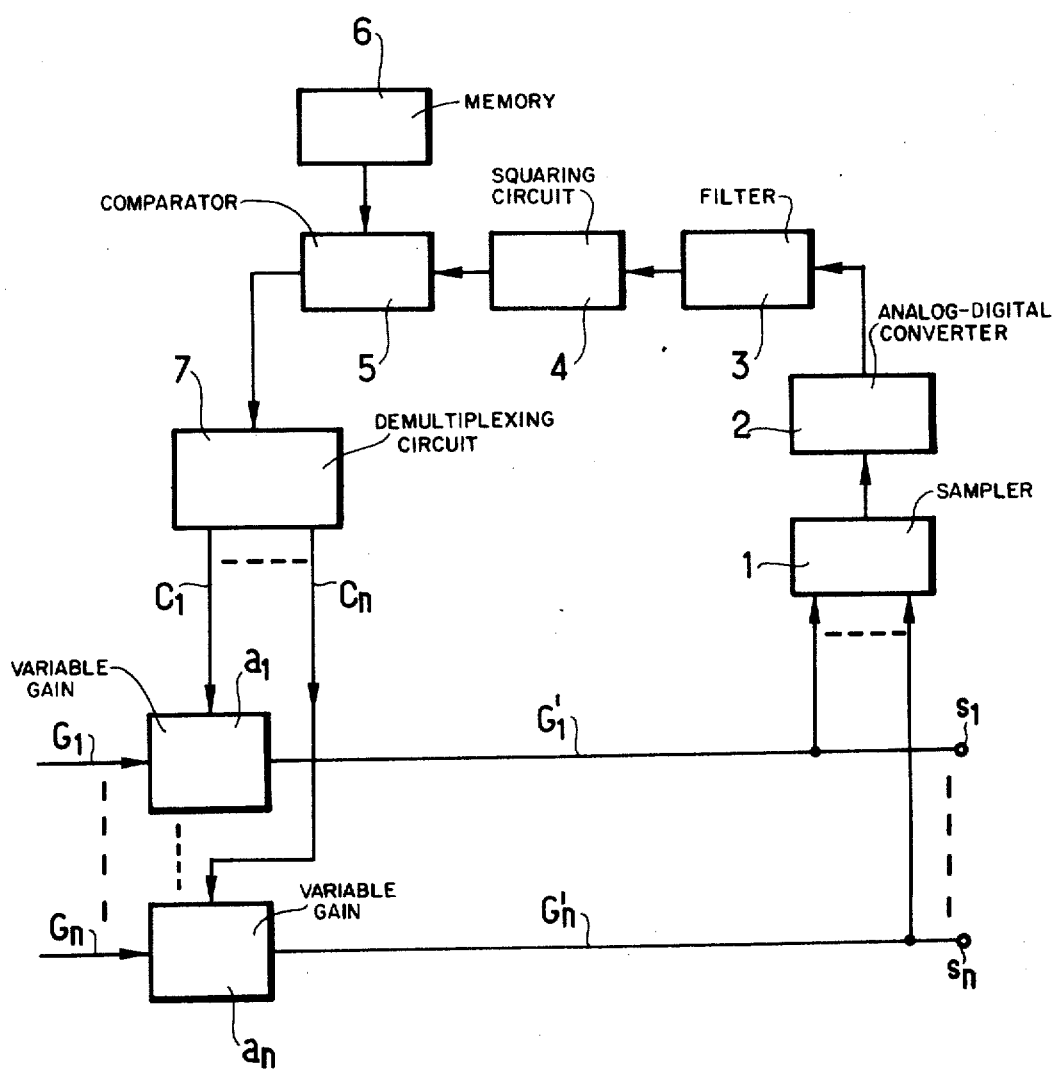
FIG. 1 shows a general synoptic diagram of a regulator according to the first embodiment of the invention.

In FIG. 1, $n$ primary groups G1 to G$n$ each containing a pilot wave, that is, M1 to M$n$ respectively, are applied to the respective inputs of $n$ variable gain networks $a$1 to $an$. To give a clear idea, each primary group G1 to G$n$ takes up the 60kc/s – 108 kc/s frequency band, the corresponding pilot wave being situated at 84.140 kc/s.

The networks $a$1 to a$n$ are respectively controlled by signals C1 to C$n$ the generating mode of which will be seen further on. The multiplex groups, that is, G'1 to G'$n$ sent out on the respective outputs of the networks $a$1 to a$n$ are sent out respectively on the one hand on $n$ outputs $s$1 to $sn$ of the regulator represented and on the other hand on $n$ inputs of a sampling device 1. The sampling device 1 samples in a sequential manner the groups G'1 to G'$n$, each group being examined at a frequency F$e$ and the sampling device 1 therefore operating at the rythm $n$· F$e$. In the example considered, where each group takes up the 60kc/s – 108kc/s frequency band, the band width of the signals to be sampled is less than the lowest frequency of the band: it is therefore an advantage to impart to the frequency F$e$ a value comprised between the highest frequency of the band (that is, 108kc/s) and twice the lowest frequency of the band (that is, 2 × 60kc/s). To give a clear idea, it will be assumed that F$e$ = $114$ kc/s, this corresponding to a sampling T$e$ of 8.75 $\mu$s.

The sampling device 1, which is of a known type, sends out successively during each sampling period the samples concerning the $n$ groups G'1 to G'$n$. An analog-digital converter 2 codes these samples in the form of binary words $x$1 to $xn$ respectively. A 14-bit coding is chosen to great advantage in the example considered. The words $x$1 to $xn$ sent out at each sampling period are applied to a digital filter 3. The filter 3 is a band-pass whose function is to extract from each of the groups $G'1$ to $G'n$ the pilot wave which it contains, that is, $M'1$ to $M'n$ respectively.

That filter is used on a time sharing basis for precessing the various groups to each of which is therefore assigned, at each sampling period, a calculation time equal to $1/n \cdot Fo$. It is constituted, to great advantage, in the example in question, by an eight-pole recursive filter having a band width of 30 c/s. The embodiment of that filter entails the implenting of circuits for effecting additions and multiplications on binary numbers as well as of memories for storing temporarily the data concerning the groups which are not being processed; that embodiment being of a known type, it will not be described in more detail.

In response to the words $x1$ to $xn$, the filter 3 sends out successively, at each sampling period, binary words $y1$ to $yn$ representing respectively the instantaneous values of the amplitude of the pilot waves $M'1$ to $M'n$ extracted from the groups $G'1$ to $G'n$ respectively. A data item concerning the level of each of the waves $M'1$ to $M'n$, which are sinusoidal waves, is obtained in a calculating circuit 4 which determines for each of them a value proportional to the mean square value of that wave. To do this, the circuit 4 calculates the square of the values supplied by the filter 3 and works out, for each of the waves $M'1$ to $M'n$, over a period $Tc$ which is called the calculation period and which is equal to a number $p$ of sampling periods, the sum of the square of the values concerning that wave; each of these sum is (according to Perceval's theorem) proportional to the average square value over the period $Tc$ of the corresponding wave; for the wave $M'i$ $i$ being comprised between 1 and $n$, that sum is equal to $k \cdot Ai2$ where K is a factor of proportionality and $Ai$ is the root mean square value of the wave $M'i$ over a period $Tc$.

To effect these calculations, the circuit 4 comprises a circuit for raising the square power processing at each sampling period the words $y1$ to $yn$ and an accumulator operating on a time-sharing basis for the waves $M'1$ to $M'n$ to work out, at each sampling period an for each wave, the sum of the last $p$ values concerning that wave and calculated in the circuit for raising to the square power. The result of these sums is sent out at each sampling period in the form of binary numbers $z1$ to $zn$ respectively.

The words $z1$ to $zn$ are applied accessively during each sampling period to a comparison element 5 which is connected moreover to a memory 6. A binary number $zo$ representing the rated mean square value of the pilot waves of the groups to be regulated is recorded in the memory 6, that value being the same for the various groups in the example considered. $Ao$ designating that effective common value, the number $zo$ corresponds to the value $K \times Ao$.

During each sampling period, the comparison element 5 compares successively each of the numbers $z1$ to $zn$ with the number $zo$ and the results of these comparisons appear at the output of the comparator in the form of successive binary words $v1$ to $vn$ respectively. The words $v1$ to $vn$ are applied to the input of a demultiplexing circuit 7. The signals $C1$ to $Cn$ for controlling the networks $a1$ to $an$, constitued respectively by the words $v1$ to $vn$ emitted during the successive sampling periods, are sent out on $n$ outputs of the demultiplexing circuit 7 respectively. The element 1, 2, 3, 4, 5 and 7 of the regulator illustrated are, of course, connected to a general time base, not shown, which controls their respective working rhythms.

The variable gain networks $a1$ to $an$ have not been illustrated in detail: they can be of any known type. For example, they can each be constituted by a variable gain amplifier comprising a network of resistors having one resistance value or another, among a set of possible values, as a function of binary control data; the set of resistance values of a network corresponding, of course, to a set of possible values for the gain of the amplifier concerned. The signal $Ci$ applied for controlling the resistance networks of the amplifier $ai$, thus makes it possible to determine at each sampling period the value of the gain of the amplifier $ai$ as a function of the difference in the level of the pilot wave $M'1$ in relation to its rated value (the level being here evaluated by means of the mean square value) so as to reduce and eliminate that difference. When that difference is zero, the level of the pilot wave $M'i$ and hence that of the primary group $C'i$ are adjusted to the required values.

The response time of the regulator for the $n$ groups $G1$ to $Gn$ as a whole is substantially the same as for any one of them alone. It is given by the response time of the digital filter 3 to which is added the duration of a sampling period. With the digital values given previously by way of illustration, the response time of the filter is very close to 150 milliseconds; it has been seen that the sampling period could be taken as equal to $8.75 \mu s$.

In the case where 50 primary groups are processed by the regulator illustrated in which the sampling is effected at 114kc/s and the coding is effected in 14-bit code, the maximum working speed of that regulator is close to 80Mbits/second.

With a view to lowering the sampling frequency in order to work with lower rhythms for processing a same number of multiplex groups, or even, to increase the number of groups can be processed by a same regulator, according to the second embodiment of the invention, a low-frequency transposition of the multiplex groups coming from the variable gain networks is effected before sampling.

Figure 2:
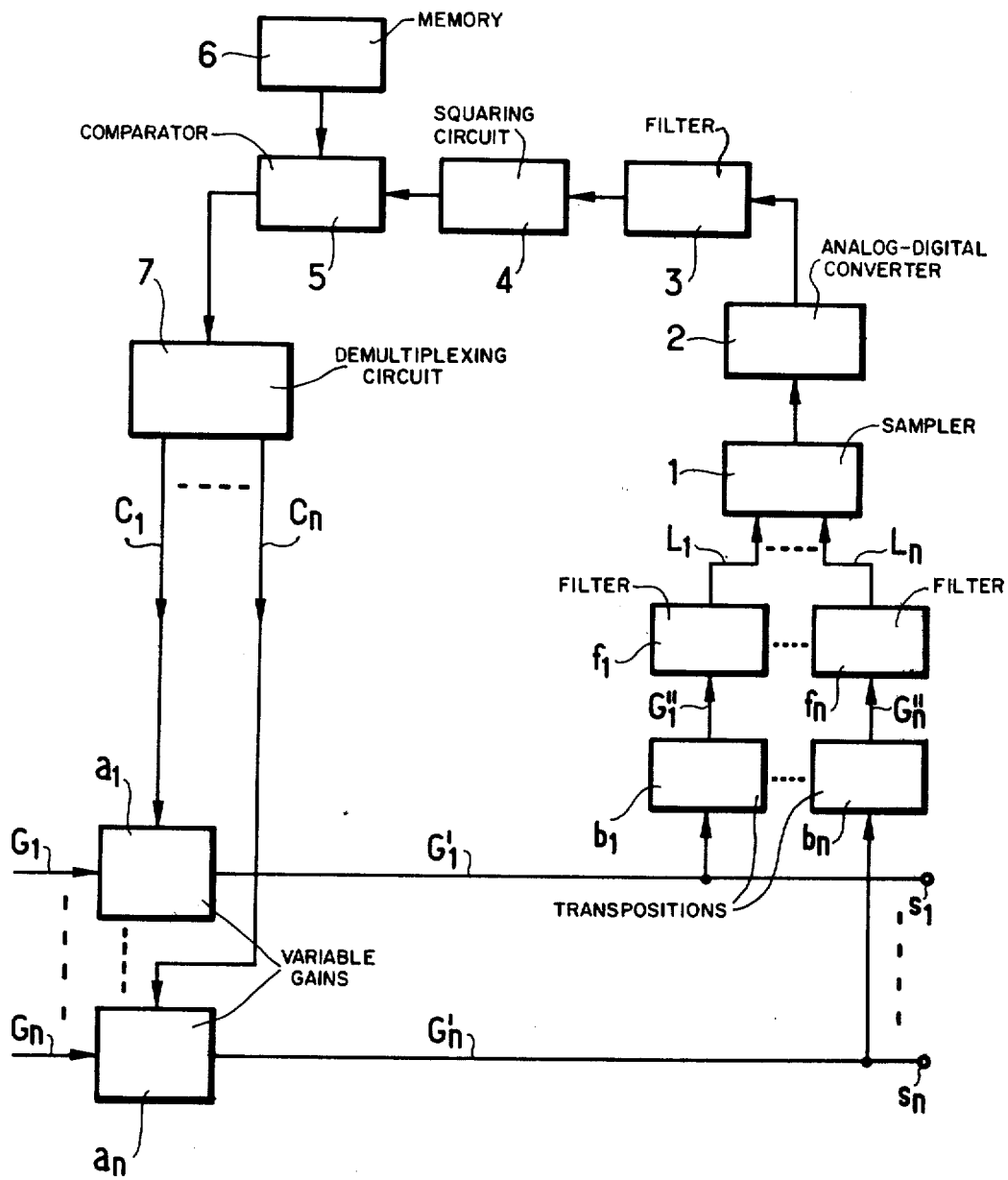
FIG. 2 shows a general synoptic diagram of a regulator according to the second embodiment of the invention.

FIG. 2 shows a general diagram of a regulator according to that second embodiment; the same references have been used for elements identical to those shown in FIG. 1. The complete description of FIG. 2 will not be given hereinafter, only the modifications in relation to FIG. 1 being described.

The primary groups $G'1$ to $G'n$, containing the pilot waves $M'1$ to $M'n$ respectively, are applied to the sampling element 1 respectively through $n$ transposition circuits $b1$ to $bn$ each followed by an analog filter, that is, $f1$ to $fn$ respectively. Each of the transposition circuits $b1$ to $bn$ receives, moreover, a transposition wave P whose frequency is selected so as to enable a transposition of the pilot waves $M'1$ to $M'n$ towards a same low frequency; for that latter frequency to be very low, a frequency close that which is common to the said pilot waves is imparted to the wave P. The filters $f1$ to $fn$, which are all identical, are low-pass filters which limit the frequency spectrum of the signals, that is, $G''1$ to $G''n$, leaving the circuits $b1$ to $bn$ respectively, with a view to the sampling thereof. The signals at the output of the filters $f1$ to $fn$, that is, $L1$ to $Ln$ respectively, and containing the transposed pilot waves, that is, $M''1$ to $M''n$ respectively, are then sampled sequentially by the sampling device 1 with a view to their digital processing which is analogous to that which the groups G'1 to G'n undergo in the first embodiment of the invention described with reference to FIG. 1.

To give a clear idea, the group G'i taking up the 60kc/s −108kc/s frequency band in which the pilot wave M'i is situated at 84.140 kc/s, the frequency of the transposition wave P, for example, is selected to be 84kc/s, this bringing the pilot wave to 140 c/s after transposition.

The spectral distribution of the group G''i in the vicinity of the wave M''i is modified in relation to the spectral distribution of the group G'i in the vicinity of the wave M'i, the transposition being made by the wave P whose frequency, close to that of the wave M'i, is situated within the frequency band of the group G'i. Indeed, taking again the above-mentioned example, after transposition, it is found that the 0–24kc/s band contains not only the (conservation) channels of the group G'i situated within the 84kc/s - 108kc/s, but also the channels which were situated in the 60kc/s - 84kc/s band which are inverted by the transposition.

A more severe filtering than in the first embodiment is therefore necessary to isolate the pilot waves: it is an advantage, with a view to effecting that more severe filtering, to impart, to the filters $f1$ to $fn$, a sufficiently narrow pass-band for enabling prefiltering of the spectrum in the vicinity of the waves M''1 to M''n respectively before the action of the digital filter 3.

The transposition described hereinabove makes it possible to lower very substantially the value of the sampling frequency Fe, which can be assumed, for example, to be equal to 4kc/s. Moreover, due to the pre-filtering effected by the filters $f1$ to $fn$, the signals to be digitally processed bring into effect lower powers, this making it possible to reduce the number of bits necessary for the coding of the samples. In the example considered, for a filter $fi$ whose cut-off frequency is 200c/s and having a slope of 24 dB/octave, the samples are coded, to great advantage, in 10-bit code. The maximum working speed of the regulator, for processing 50 primary groups on a time sharing basis is then 2 Mbits/second.

The invention has been described with reference to particular examples of embodiment but it is quite evident that modifications can be made thereto and/or that certain means can be replaced by other technically equivalent means therein. More particularly, the calculating circuit 4 could be arranged for calculating an average of the absolute values of the numbers, concerning a same pilot wave, which are applied to it over a calculation period Tc, or any other function of these numbers giving an indication concerning the level of the pilot wave concerned, the memory 6 connected to the comparison element then memorizing the rated value of the corresponding function. Morover, in the second embodiment of the invention which has been described, although a preferred example of embodiment has been shown, it would be possible for the analog filters ($f1$ to $fn$) to be arranged exclusively with a view to limit the spectrum of the frequencies to be sampled and not to act as prefilters for the transposed pilot waves; the extracting of these latter would then be effected entirely by the digital filter, whose order be higher.

It should be well understood, morover, that the multiplex systems applied in the first embodiment to the sampling device 1 and in the second embodiment to the transposition circuits ($b1$ to $bn$) can be picked up not directly at the outputs of the variable gain networks ($a1$ to $an$) but downstream from those networks along the transmission chain.

Moreover, it quite evident that the invention is not limited to the regulating of primary groups of telephonic channels and that the numerical values indicated have been given only by way of illustration; it applies generally to the regulating of frequency division multiplex groups based on the observing of the amplitude of the pilot waves contained in these groups. It will be observed that a regulator according to the invention could process, on a time sharing basis, multiplex systems having pilot waves with different rated levels; in that case, the memory 6 connected to the comparison element 5 would contain as many different values as there are different rated levels and those values would be applied in a sequential manner to the said element 5. A regulator according to the invention could also process, on a time sharing basis, multiplex groups covering different frequency bands; in that case, the second embodiment described, in which the transposition circuits would receive different frequency transposition waves chosen so as to bring all the pilot waves to a same frequency, would be preferable, for the digital filter 3 could then effect the extracting of the pilot waves thus transposed without changing coefficients from one wave to another.

We claim:

1. Level regulator for $n$ frequency division multiplex transmission systems comprising $n$ variable gain networks for adjusting the transmission level of said multiplex systems respectively, from the amplitudes of $n$ pilot waves contained in said systems, a sampling device connected to said variable gain networks and rhythmed by a clock for sequentially sampling the multiplex systems downstream from said networks and delivering the samples concerning said $n$ systems, in a time division multiplex form, an analog-digital converter for sending out digital values of the samples coming from the sampling device, digital filtering means having a narrow band and operating on a time sharing basis for said $n$ systems for sending out, successively, at each sampling period in response to the $n$ digital values of the samples of said $n$ systems respectively, $n$ digital values $y1$ to $yn$ representing respectively the sampled amplitudes of the pilot waves extracted from the multiplex systems downstream from the networks, a calculation circuit receiving at each sampling period the values $y1$ to $yn$ and operating on a time sharing basis for elaborating new values $z1$ to $zn$ which are, respectively, function of the levels of the pilot waves downstream from the variable gain networks over a time interval of several sampling periods, a comparison element for comparing at each sampling period each of said values $z1$ to $zn$ with a reference value and delivering as the results of these comparisons $n$ values for the control of said $n$ variable gain networks respectively, and a demultiplexing circuit connected to the output of said comparison element for applying said $n$ values for the control to said $n$ variable gain networks respectively.

2. Level regulator according to claim 1, wherein said calculation circuit comprises a circuit for raising to the square power the values transmitted by said digital filtering means, and an accumulator connected to said circuit for raising to the square power and operating on a time sharing basis for calculating at each sampling period and for each system the sum of the last $p$ values related to that system and delivered by said circuit for raising to the square power.

3. Level regulator according to claim 1, comprising, further, $n$ transposition circuits each receiving a transposition wave, and being inserted respectively between said $n$ networks and said sampling device, for transposing respectively the $n$ multiplex systems so as to bring the $n$ corresponding pilot waves to a same low frequency, a filter following each transposition circuit and limiting the spectrum of the frequencies sampled.

4. Level regulator according to claim 3, wherein the frequency of each transposition wave is selected to be close to the frequency of the corresponding pilot wave, each filter limiting the spectrum of the frequencies to be sampled comprising a low-pass filter providing pre-filtering of the corresponding transposed pilot wave.

5. Level regulator according to claim 3, wherein said calculation circuit comprises a circuit for raising to the square power the values transmitted by said digital filtering means and an accumulator connected to said circuit for raising to the square power and operating on a time sharing basis for calculating at each sampling period and for each system the sum of the last $p$ values related to that system and delivered by said circuit for raising to the square power.

* * * * *